(12) United States Patent
Xu et al.

(10) Patent No.: US 11,180,191 B2
(45) Date of Patent: Nov. 23, 2021

(54) SYSTEM AND METHOD FOR UNINTENDED STEERING MITIGATION

(71) Applicant: STEERING SOLUTIONS IP HOLDING CORPORATION, Saginaw, MI (US)

(72) Inventors: Xinfu (Kaiser) Xu, Jiangsu (CN); Young Jaepil Chang, Jiangsu (CN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 55 days.

(21) Appl. No.: 16/724,726

(22) Filed: Dec. 23, 2019

(65) Prior Publication Data
US 2021/0188349 A1   Jun. 24, 2021

(51) Int. Cl.
*B62D 6/04* (2006.01)
*B62D 5/04* (2006.01)
*B62D 1/04* (2006.01)

(52) U.S. Cl.
CPC ............... *B62D 6/04* (2013.01); *B62D 1/04* (2013.01); *B62D 5/0493* (2013.01)

(58) Field of Classification Search
CPC ........... B62D 6/04; B62D 1/04; B62D 5/0493
USPC ............................................. 701/41
See application file for complete search history.

(56) References Cited

U.S. PATENT DOCUMENTS

| 6,965,820 B2 * | 11/2005 | Amberkar | B62D 5/0472 180/443 |
| 2018/0312164 A1 * | 11/2018 | Sasabuchi | B60W 30/17 |

* cited by examiner

*Primary Examiner* — Gertrude Arthur Jeanglaude
(74) *Attorney, Agent, or Firm* — Dickinson Wright PLLC (57) ABSTRACT

A method for unintended steering mitigation includes receiving at least one hand wheel measurement correspond to a hand wheel of a vehicle. The method also includes determining a hand wheel return value corresponding to the at least one hand wheel measurement. The method also includes receiving a torque value corresponding to propulsion of the vehicle. The method also includes determining whether the torque value is above a threshold. The method also includes, in response to a determination that the torque value is above the threshold adjusting the hand wheel return value based on the torque value and selectively controlling return of the hand wheel based on the adjusted hand wheel return value.

20 Claims, 4 Drawing Sheets

SYSTEM AND METHOD FOR UNINTENDED STEERING MITIGATION

TECHNICAL FIELD

This disclosure relates to vehicle steering and in particular to systems and methods for unintended steering mitigation.

BACKGROUND OF THE INVENTION

Vehicles, such as cars, trucks, sport utility vehicles, crossovers, mini-vans, or other suitable vehicles, may experience torque steer or traction steer during operating events where corresponding wheels of such vehicles are turned. For example, an operator of such a vehicle may turn a steering mechanism to guide the vehicle along a curved portion of a path being traversed by the vehicle. During such events, the operator may experience the torque steer or traction steer as erratic behavior in the steering mechanism.

Typically, such vehicles are provided with an unintended steering mitigation system that applies a return torque to the steering mechanism to reduce or eliminate such erratic behavior in the steering mechanism. Such unintended steering mitigation systems typically analyze various characteristics of the steering mechanism during such operating events. The unintended steering mitigation system determines a return torque value based on the various characteristics and applies torque to the steering mechanism according to the return torque value in order to reduce or eliminate the erratic behavior of the steering mechanism.

SUMMARY OF THE INVENTION

This disclosure relates generally to unintended steering mitigation for vehicles.

An aspect of the disclosed embodiments includes a system for unintended steering mitigation. The system includes a processor and a memory. The memory includes instructions that, when executed by the processor, cause the processor to: receive at least one hand wheel measurement correspond to a hand wheel of a vehicle; determine a hand wheel return value corresponding to the at least one hand wheel measurement; receive a torque value corresponding to propulsion of the vehicle; determine whether the torque value is above a threshold; and in response to a determination that the torque value is above the threshold, adjust the hand wheel return value based on the torque value and selectively control return of the hand wheel based on the adjusted hand wheel return value.

Another aspect of the disclosed embodiments includes a method for unintended steering mitigation. The method includes receiving at least one hand wheel measurement correspond to a hand wheel of a vehicle. The method also includes determining a hand wheel return value corresponding to the at least one hand wheel measurement. The method also includes receiving a torque value corresponding to propulsion of the vehicle. The method also includes determining whether the torque value is above a threshold. The method also includes, in response to a determination that the torque value is above the threshold adjusting the hand wheel return value based on the torque value and selectively controlling return of the hand wheel based on the adjusted hand wheel return value.

Another aspect of the disclosed embodiments includes an unintended steering mitigation apparatus. The unintended steering mitigation apparatus includes a controller configured to execute instructions stored on a corresponding memory to: receive a hand wheel position of a hand wheel of a vehicle; receive a hand wheel torque value of the hand wheel; receive a hand wheel velocity of the hand wheel; determine a hand wheel return value based on the hand wheel position, the hand wheel torque value, and the hand wheel velocity; receive a torque value corresponding to propulsion of the vehicle; determine whether the torque value is above a threshold; and in response to a determination that the torque value is above the threshold adjust the hand wheel return value based on the torque value and selectively control return of the hand wheel based on the adjusted hand wheel return value.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, Vehicles, such as cars, trucks, sport utility vehicles, crossovers, mini-vans, or other suitable vehicles, may experience torque steer or traction steer during operating events where corresponding wheels of such vehicles are turned. For example, an operator of such a vehicle may turn a steering mechanism to guide the vehicle along a curved portion of a path being traversed by the vehicle. Torque steer may include automatic steering caused by unequal driveline torques. Traction steer may include automatic steering caused by unequal traction forces at two front wheels of the vehicle, even though the driveline torques may be balanced on both sides of the vehicle (e.g., driving on a μ-split road).

During such events, the operator may experience the torque steer or traction steer as erratic behavior in the steering mechanism. Generally, torque steer and/or traction steer may result in steering to one side of the vehicle when accelerating in a relatively straight line or reduced return in the steering mechanism when the vehicle is cornering.

Typically, such vehicles are provided with an unintended steering mitigation system that applies a return torque to the steering mechanism to reduce or eliminate such erratic behavior in the steering mechanism. Such unintended steering mitigation systems typically analyze various characteristics of the steering mechanism during such operating events. Such steering mitigation systems may consider a total transmission torque and may use one scale factor for all cases (e.g., for all steering mechanism torques and vehicle speeds). For example, an unintended steering mitigation system may analyze a position of the steering mechanism, a torque applied to the steering mechanism, and a velocity of the steering mechanism in order to determine a return torque value. The unintended steering mitigation system may then apply torque to the steering mechanism according to the return torque value in order to reduce or eliminate the erratic behavior of the steering mechanism.

However, at relatively high vehicle speeds, such typical unintended steering mitigation systems may be limited and may not provide adequate steering mitigation. Additionally, or alternatively, electric vehicle motors may generate significantly higher amounts of torque than internal combustion vehicles.

Accordingly, systems and methods, such as those described herein, that are configured to provide improved unintended steering mitigation, particularly at low to medium vehicle speeds and/or in electric vehicles, may be desirable. In some embodiments, the systems and methods described herein may be configured to add a total/differential transmission torque based scale factor to the return torque determination. The systems and methods described herein may be configured to tune the return torque based on the total/differential transmission torque and a vehicle speed, according to torque steer characteristics in different vehicles. The systems and methods described herein may be configured to return the steering mechanism to center (e.g., relative to a reference position) perfectly or substantially perfectly.

In some embodiments, the systems and methods described herein may be configured to receive at least one hand wheel measurement correspond to a hand wheel of a vehicle. The systems and methods described herein may be configured to determine a hand wheel return value corresponding to the at least one hand wheel measurement. The systems and methods described herein may be configured to receive a torque value corresponding to propulsion of the vehicle. The systems and methods described herein may be configured to determine whether the torque value is above a threshold. The systems and methods described herein may be configured to, in response to a determination that the torque value is above the threshold adjust the hand wheel return value based on the torque value and selectively control return of the hand wheel based on the adjusted hand wheel return value.

In some embodiments, the systems and methods described herein may be configured to reduce or eliminate pull on the vehicle to one side when accelerating in a substantially straight trajectory. The systems and methods described herein may be configured to provide improved unintended steering mitigation using current (e.g., in use) steering control systems.

Figure 1:
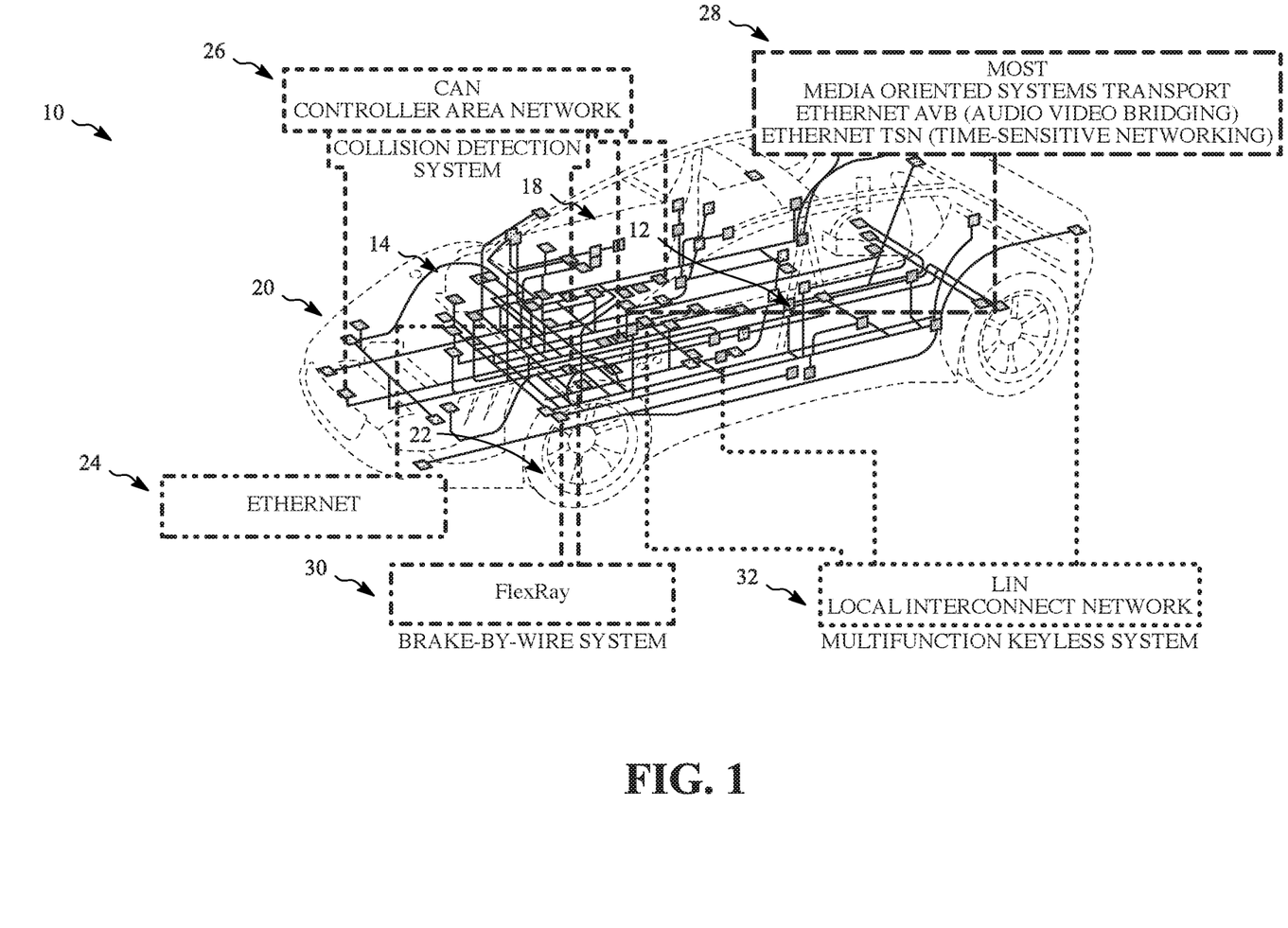
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
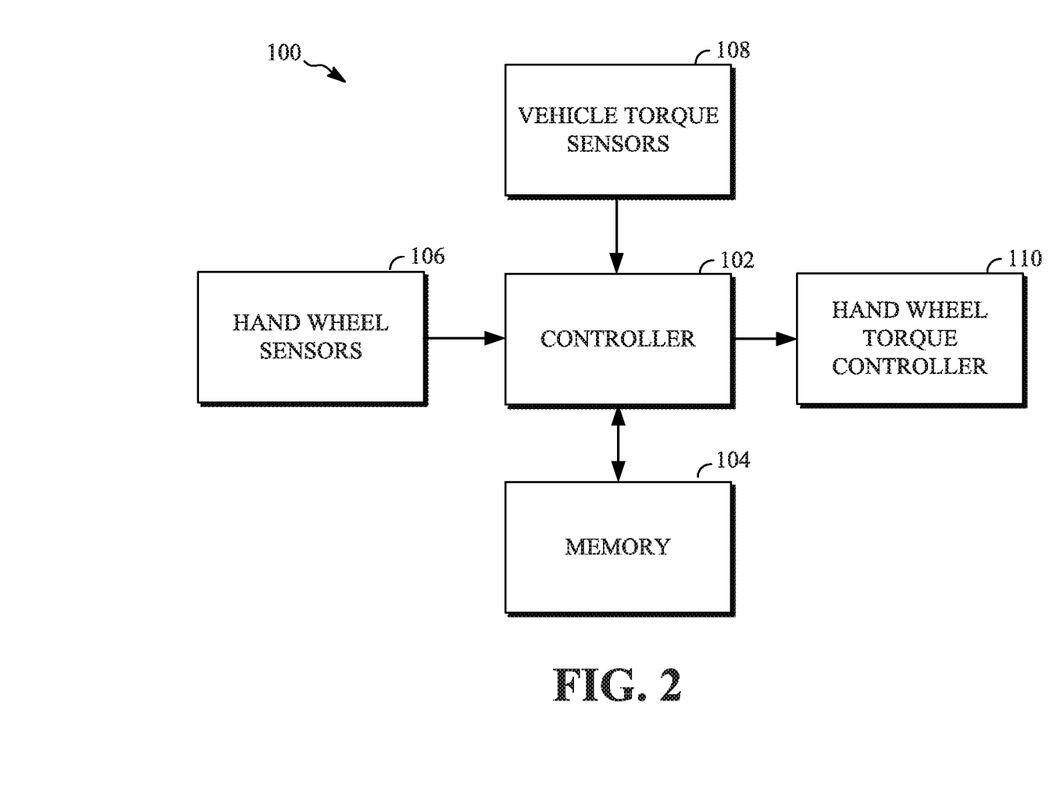
FIG. 2 generally illustrates an unintended steering mitigation system to the principles of the present disclosure.

The vehicle 10 may include an unintended steering mitigation system 100 as is generally illustrated in FIG. 2. The system 100 may be configured to provide steering mitigation to the vehicle 10 during steering events resulting in torque steer or traction steer. The system 100 includes a controller 102. The controller 102 may include any suitable controller or processor, such as those described herein. The controller 102 may be configured to executed instructions stored on a memory, such as the memory 104. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof.

The instructions stored on the memory 104, when executed by the controller 102, cause the controller 102 to, at least, provide steering mitigation, as described. For example, the controller 102 may receive one or more measurements corresponding to various characteristics of a steering mechanism of the vehicle 10. The steering mechanism may include any suitable steering mechanism, such as a steering wheel or hand wheel. The steering mechanism may be referred to as a hand wheel, hereinafter. The measurements corresponding to various characteristics of the hand wheel may include a hand wheel position. For example, the system 100 may include various hand wheel sensors 106. The hand wheel sensors 106 may include a hand wheel position sensor. The hand wheel position sensor may be disposed proximate to the hand wheel or remote from the hand wheel. The hand wheel position sensor may be configured to measure a positon of the hand wheel relative to a reference position. The reference position may include a center position of the hand wheel (e.g., a position of the hand wheel where the wheels 22 of the vehicle 10 are centered).

The hand wheel position sensor may measure an angle of rotation relative to the reference point or a distance between the position of the hand wheel and the reference position, during rotation of the hand wheel. For example, the operator of the vehicle 10 may guide the vehicle 10 along a curved portion of a path being traversed by the vehicle 10. When the operator turns the hand wheel in order to follow the curative of the path, the distance between the position of the hand wheel and the reference position increases. The hand wheel position sensor is configured to generate a hand wheel position signal corresponding to the hand wheel position measurement. The hand wheel position sensor communicates the hand wheel position signal to the controller 102.

In some embodiments, the hand wheel sensors 106 includes a hand wheel torque sensor. The hand wheel torque sensor may be configured to measure an amount of torque applied to the hand wheel during rotation of the hand wheel. For example, when the operator rotates the hand wheel to follow the curvature of the path, the operator applies an amount of torque to the hand wheel. Additionally, or alternatively, when the vehicle 10 experiences torque steer or traction steer, an amount of torque may be applied to the hand wheel from, for example, the wheels 22 of the vehicle 10. The hand wheel torque sensor determines a hand wheel torque value corresponding to the amount of torque applied to the hand wheel. The hand wheel torque sensor generates a hand wheel torque signal corresponding to the hand wheel torque value. The hand wheel torque sensor may communicate the hand wheel torque signal to the controller 102.

In some embodiments, the hand wheel sensors 106 may include a hand wheel velocity sensor. The hand wheel velocity sensor may be configured to measure a velocity of rotation of the hand wheel. For example, when the operator rotates the hand wheel to follow the curvature of the path, the hand wheel rotates at a velocity. Additionally, or alternatively, when the vehicle 10 experiences torque steer or traction steer, an amount of torque may be applied to the hand wheel from, for example, the wheels 22 of the vehicle 10, which may increase or decrease the hand wheel velocity. The hand wheel velocity sensor determines a hand wheel velocity of the hand wheel. The hand wheel velocity sensor generates a hand wheel velocity signal corresponding to the hand wheel velocity. The hand wheel velocity sensor may communicate the hand wheel velocity signal to the controller 102.

In some embodiments, the vehicle 10 includes various vehicle torque sensors 108. The vehicle torque sensors 108 may include a transmission torque sensor or other suitable sensor configured to measure and/or calculate the transmission torque. The transmission torque sensor may be configured to measure a transmission torque generated by the transmission of the vehicle 10. The transmission torque may correspond or be related to an engine speed (e.g., during propulsion of the vehicle 10) of the vehicle 10. The transmission torque sensor may determine a transmission torque value corresponding to the measured transmission torque. The transmission torque sensor may generate a transmission torque signal corresponding to the transmission torque. The transmission torque sensor may communicate the transmission torque signal to the controller 102.

The vehicle torque sensors 108 may include a drive torque sensor. For example, the vehicle 10 may include an electric vehicle or a hybrid vehicle. The vehicle 10 may include one or more electric motors configured to propel the vehicle 10 during operation. The one or more electric motors generate relatively high torque amounts during operation of the vehicle 10. The drive torque sensor is configured to measure drive or motor torque generated by the one or more electric motors of the vehicle 10. The drive torque sensor may be configured to determine a motor torque value corresponding to the measured motor torque. The drive torque sensor generates a motor torque signal corresponding to the motor toque value. The drive torque senor communicates the motor torque signal to the controller 102.

In some embodiments, the controller 102 may be configured to determine a hand wheel return value (e.g., a return command) during rotation of the hand wheel (e.g., when the operator rotates the hand wheel to, for example, follow the curvature of the path, as described). For example, the controller 102 receives a hand wheel position signal corresponding to the position of the hand wheel, from the hand wheel sensors 106. The controller 102 determines a hand wheel return value corresponding to the hand wheel position. For example, the controller 102 may access a two-dimensional look-up table stored in the memory 104 or in another suitable storage device within the vehicle 10 or remotely located from the vehicle 10. The two-dimensional look-up table may include any suitable look-up table and may indicate a return value corresponding to an amount of torque to be applied to the hand wheel in order to return the hand wheel to the center position during rotation of the hand wheel.

In some embodiments, the controller 102 receives the hand wheel torque signal corresponding to the hand wheel torque value from the hand wheel sensors 106. The controller 102 may receive the hand wheel velocity signal corresponding to the hand wheel velocity from the hand wheel sensors 106. The controller 102 may scale or adjust the hand wheel return value based on the hand wheel torque value, the hand wheel velocity, or a combination thereof.

For example, the controller 102 may access the two-dimensional look-up table or another suitable look-up table to identify a hand wheel torque scaling value corresponding to the hand wheel torque value. The hand wheel torque scaling value may indicate an amount to scale (e.g., to increase or decrease by) the hand wheel return value by to compensate for the hand wheel torque value. The controller 102 may access the two-dimensional look-up table or another suitable look-up table to identify a hand wheel velocity scaling value corresponding to the hand wheel velocity value. The hand wheel velocity scaling value may indicate an amount to scale (e.g., to increase or decrease by) the hand wheel return value by to compensate for the hand wheel velocity value. The controller 102 may scale or adjust the hand wheel return value according to the hand wheel torque scaling value, the hand wheel velocity scaling value, or a combination thereof.

In some embodiments, the controller 102 may be configured to further scale or adjust the hand wheel return value based on the transmission torque value and/or the motor torque value. For example, the controller 102 may receive the transmission torque signal corresponding to the transmission torque value from the vehicle torque sensors 108. The controller 102 may determine whether the transmission torque value is greater than a threshold. The threshold may include any suitable value and may correspond to a torque value indicative of the transmission torque contributing to erratic behavior of the hand wheel (e.g., when the vehicle 10 is operating at relatively high speeds).

If the controller 102 determines that the transmission torque value is greater than the threshold, the controller 102 may access the two-dimensional look-up table or another suitable look-up table to identify a transmission torque scaling value corresponding to the transmission toque value. The transmission torque scaling value may indicate an amount to scale (e.g., to increase or decrease by) the hand wheel return value by to compensate for the transmission torque. The controller 102 may scale or adjust the hand wheel return value according to the transmission torque scaling value. Conversely, if the controller 102 determines that the transmission torque value is less than the threshold, the controller 102 does not scale or adjust the hand wheel return value to compensate for the transmission torque value.

In some embodiments, the controller 102 may receive the motor torque signal corresponding to the motor torque value from the vehicle torque sensors 108. The controller 102 may determine whether the motor torque value is greater than a threshold. The threshold may include any suitable value and may correspond to a torque value indicative of the motor torque contributing to erratic behavior of the hand wheel (e.g., when the vehicle 10 includes one or more electric motors and/or is operating at relatively high vehicle speeds).

If the controller 102 determines that the motor torque value is greater than the threshold, the controller 102 may access the two-dimensional look-up table or another suitable look-up table to identify a motor torque scaling value corresponding to the motor toque value. The motor torque scaling value may indicate an amount to scale (e.g., to increase or decrease by) the hand wheel return value by to compensate for the motor torque. The controller 102 may scale or adjust the hand wheel return value according to the motor torque scaling value. Conversely, if the controller 102 determines that the motor torque value is less than the threshold, the controller 102 does not scale or adjust the hand wheel return value to compensate for the motor torque value.

In some embodiments, the controller 102 may receive the transmission torque signal and the motor torque signal. The controller 102 may determine whether one or both of the transmission torque value and the motor torque value are above the threshold, and may identify the transmission torque scaling value and the motor torque scaling value, accordingly. The controller 102 may scale or adjust the hand wheel return value according to the transmission torque scaling value and the motor torque scaling value.

The system 100 includes a hand wheel torque controller 110. The hand wheel torque controller 110 may include any suitable controller or processor, such as those described herein. The hand wheel torque controller 110 may be configured to apply an amount of torque to the hand wheel to control the hand wheel, at least, when the vehicle 10 experiences traction steer and/or torque steer, as described. The controller 102 may instruct the hand wheel torque controller 110 to apply an amount of torque corresponding the hand wheel return value. The hand wheel torque controller 110 apples the amount of torque to the hand wheel.

In some embodiments, the controller 102 may be configured to provide a signal error strategy. For example, if one or more of the hand wheel position signal, the hand wheel torque signal, the hand wheel velocity signal, the transmission torque signal, and the motor torque signal is invalid or not received, the controller 102 may use a previously receive value corresponding to the respective invalid or not receives signal. In some embodiments, the system 100 may include one or more low pass filters, or other suitable filters, electrically connected between the hand wheel sensors 106 and the controller 102, between the vehicle torque sensors 108 and the controller 102, and/or the hand wheel toque controller 110 and the controller 102.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 3:
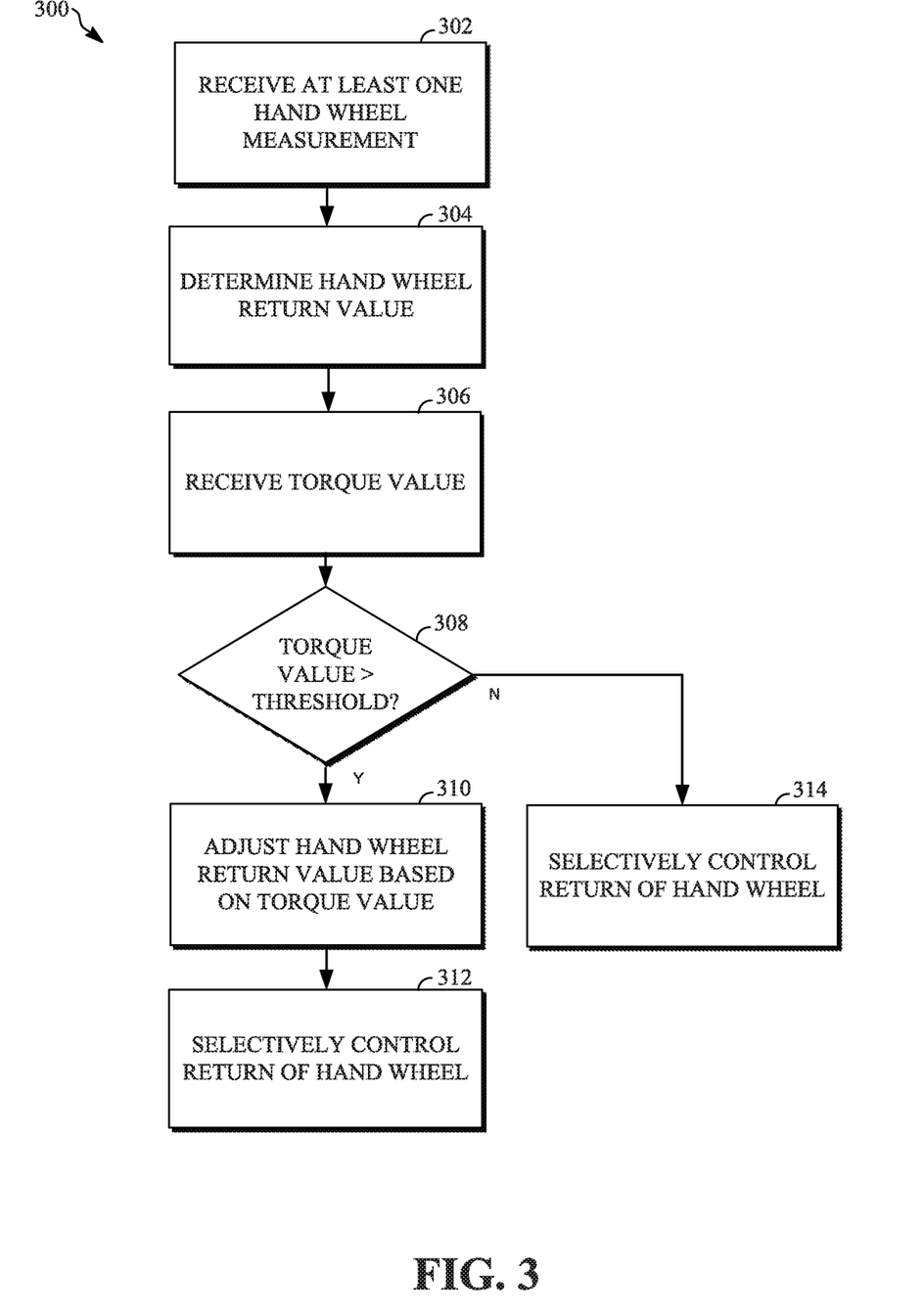
FIG. 3 is a flow diagram generally illustrating an unintended steering mitigation method according to the principles of the present disclosure.

FIG. 3 is a flow diagram generally illustrating an unintended steering mitigation method 300 according to the principles of the present disclosure. At 302, the method 300 receives at least one hand wheel measurement. For example, the controller 102 receives at least one of the hand wheel position signal, the hand wheel torque signal, and/or the hand wheel velocity signal. At 304, the method 300 determines a hand wheel return value. For example, the controller 102 identifies a hand wheel return value in the two-dimensional look-up table based on the at least one measurement. At 306, the method 300 receives a torque value. For example, the controller 102 receives the transmission torque value and/or the motor torque value.

At 308, the method 300 determines whether the torque value is greater than a threshold. For example, the controller 102 determines whether the torque value is greater than the threshold. If the controller 102 determine that the torque value is greater than the threshold, the method 300 continues at 310. If the controller 102 determines that the torque value is less than the threshold, the method 300 continues at 314.

At 310, the method 300 adjusts the hand wheel return value based on the torque value. For example, the controller 102 retrieves the transmission torque scaling value and/or the motor torque scaling value from the two-dimensional look-up table. The controller 102 scales or adjusts the hand wheel return value according to the transmission torque scaling value and/or the motor torque scaling value. At 312, the method 300 selectively controls return of the hand wheel. For example, the controller 102 communicate the hand wheel return signal corresponding to the adjusted hand wheel return value to the hand wheel torque controller 110. The hand wheel torque controller 110 controls return of the hand wheel according to the adjusted hand wheel return value.

At 314, method 300 selectively controls return of the hand wheel. For example, the controller 102 communicate the hand wheel return signal corresponding to the hand wheel return value to the hand wheel torque controller 110. The hand wheel torque controller 110 controls return of the hand wheel according to the hand wheel return value.

Figure 4:
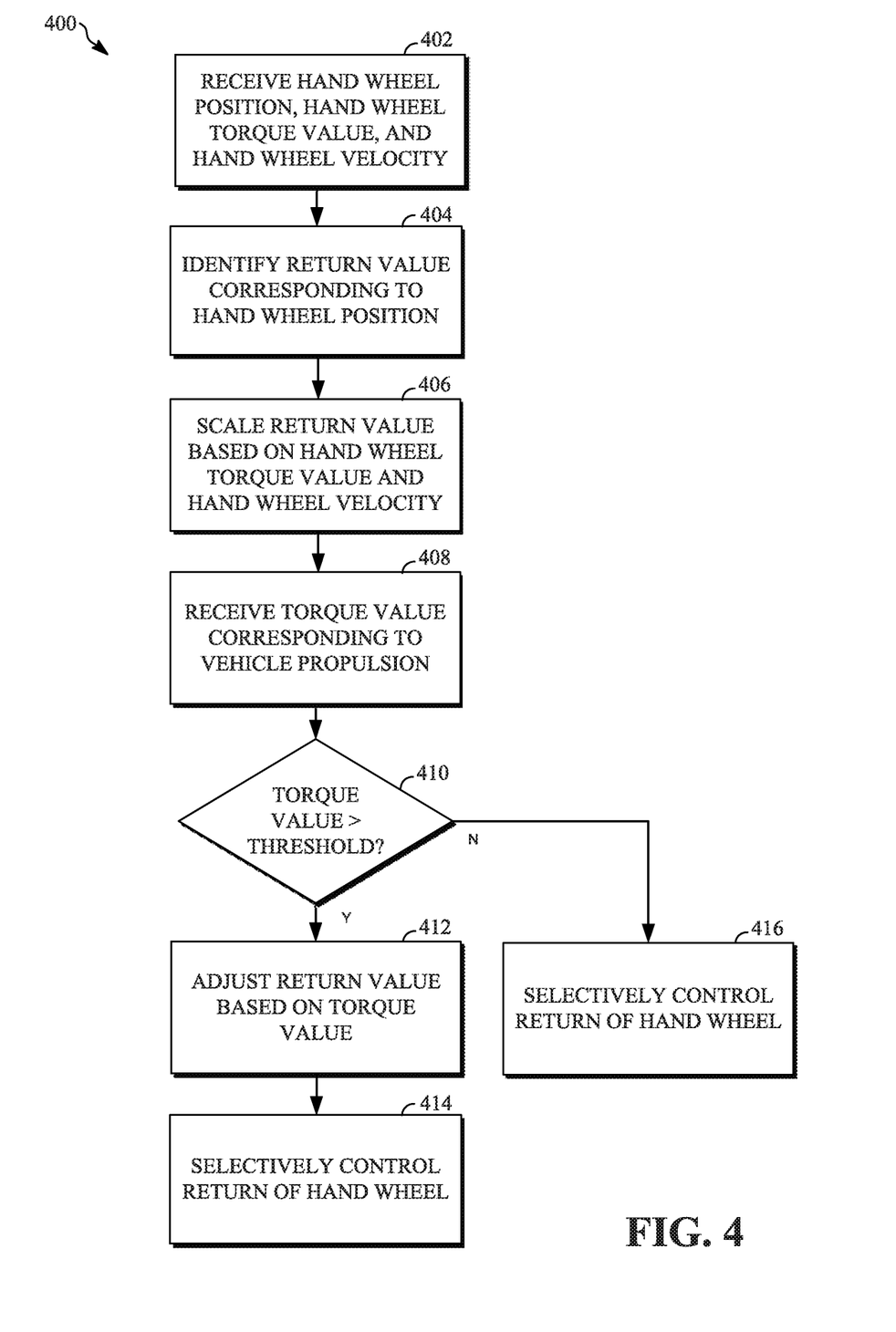
FIG. 4 is a flow diagram generally illustrating an alternative unintended steering mitigation method according to the principles of the present disclosure.

FIG. 4 is a flow diagram generally illustrating an alternative steering mitigation method 400 according to the principles of the present disclosure. At 402, the method 400 receives a hand wheel position, a hand wheel torque value, and a hand wheel velocity. For example, the controller 102 receives the hand wheel position signal corresponding to the hand wheel position, the hand wheel torque signal corresponding to the hand wheel torque value, and the hand wheel velocity signal corresponding to the hand wheel velocity from the hand wheel sensors 106. At 404, the method 400 identifies a return value corresponding to the hand wheel position. For example, the controller 102 retrieves the hand wheel return value from the two-dimensional look-up table corresponding to the hand wheel position.

At 406, the method 600 scales the return value based on the hand wheel torque value and the hand wheel velocity. For example, the controller 102 retrieves from the two-dimensional look-up table or other suitable look-up table, the hand wheel torque scaling value and the hand wheel velocity scaling value. The controller 102 scales or adjusts the hand wheel return value according to the hand wheel torque scaling value and the hand wheel velocity scaling value. At 408, the method 400 receives a torque value corresponding to vehicle propulsion. For example, the controller 102 receives the transmission torque value and/or the motor torque value.

At 410, the method 400 determine whether the torque value is greater than a threshold. For example, the controller 102 determines whether the torque value is greater than the threshold. If the controller 102 determine that the torque value is greater than the threshold, the method 400 continues at 412. If the controller 102 determines that the torque value is less than the threshold, the method 400 continues at 416.

At 412, the method 400 adjusts the return value based on the torque value. For example, the controller 102 retrieves the transmission torque scaling value and/or the motor torque scaling value from the two-dimensional look-up table. The controller 102 scales or adjusts the hand wheel return value according to the transmission torque scaling value and/or the motor torque scaling value. At 414, the method 400 selectively controls return of the hand wheel. For example, the controller 102 communicate the hand wheel return signal corresponding to the adjusted hand wheel return value to the hand wheel torque controller 110. The hand wheel torque controller 110 controls return of the hand wheel according to the adjusted hand wheel return value.

At 416, method 400 selectively controls return of the hand wheel. For example, the controller 102 communicate the hand wheel return signal corresponding to the hand wheel return value to the hand wheel torque controller 110. The hand wheel torque controller 110 controls return of the hand wheel according to the hand wheel return value.

In some embodiments, a system for unintended steering mitigation includes a processor and a memory. The memory includes instructions that, when executed by the processor, cause the processor to: receive at least one hand wheel measurement correspond to a hand wheel of a vehicle; determine a hand wheel return value corresponding to the at least one hand wheel measurement; receive a torque value corresponding to propulsion of the vehicle; determine whether the torque value is above a threshold; and in response to a determination that the torque value is above the threshold, adjust the hand wheel return value based on the torque value and selectively control return of the hand wheel based on the adjusted hand wheel return value.

In some embodiments, the at least one hand wheel measurement includes a hand wheel position. In some embodiments, the at least one hand wheel measurement includes a hand wheel torque value. In some embodiments, the at least one hand wheel measurement includes a hand wheel velocity. In some embodiments, the torque value includes a transmission torque value. In some embodiments, the torque value includes a motor torque value. In some embodiments, the vehicle include an electric vehicle. In some embodiments, the instructions further cause the processor to, in response to a determination that the torque value is above the threshold, selectively control return of the hand wheel based on the hand wheel return value.

In some embodiments, a method for steering mitigation includes receiving at least one hand wheel measurement correspond to a hand wheel of a vehicle. The method also includes determining a hand wheel return value corresponding to the at least one hand wheel measurement. The method also includes receiving a torque value corresponding to propulsion of the vehicle. The method also includes determining whether the torque value is above a threshold. The method also includes, in response to a determination that the torque value is above the threshold adjusting the hand wheel return value based on the torque value and selectively controlling return of the hand wheel based on the adjusted hand wheel return value.

In some embodiments, the at least one hand wheel measurement includes a hand wheel position. In some embodiments, the at least one hand wheel measurement includes a hand wheel torque value. In some embodiments, the at least one hand wheel measurement includes a hand wheel velocity. In some embodiments, the torque value includes a transmission torque value. In some embodiments, the torque value includes a motor torque value. In some embodiments, the vehicle includes an electric vehicle. In some embodiments, the method also includes, in response to a determination that the torque value is above the threshold, selectively controlling return of the hand wheel based on the hand wheel return value.

In some embodiments, an unintended steering mitigation apparatus includes a controller configured to execute instructions stored on a corresponding memory to: receive a hand wheel position of a hand wheel of a vehicle; receive a hand wheel torque value of the hand wheel; receive a hand wheel velocity of the hand wheel; determine a hand wheel return value based on the hand wheel position, the hand wheel torque value, and the hand wheel velocity; receive a torque value corresponding to propulsion of the vehicle; determine whether the torque value is above a threshold; and in response to a determination that the torque value is above the threshold adjust the hand wheel return value based on the torque value and selectively control return of the hand wheel based on the adjusted hand wheel return value.

In some embodiments, the torque value includes a transmission torque value. In some embodiments, the torque value includes a motor torque value. In some embodiments, the controller is further configured execute the instructions stored on the corresponding memory to, in response to a determination that the torque value is above the threshold, selectively control return of the hand wheel based on the hand wheel return value.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A system for unintended steering mitigation, the system comprising:
    a processor; and
    a memory that includes instructions that, when executed by the processor, cause the processor to:
        receive at least one hand wheel measurement corresponding to a hand wheel of a vehicle;
        determine a hand wheel return value corresponding to the at least one hand wheel measurement;
        receive a torque value corresponding to propulsion of the vehicle;
        determine whether the torque value is above a threshold; and
        in response to a determination that the torque value is above the threshold:
            adjust the hand wheel return value based on the torque value; and
            selectively control return of the hand wheel based on the adjusted hand wheel return value.

2. The system of claim 1, wherein the at least one hand wheel measurement includes a hand wheel position.

3. The system of claim 1, wherein the at least one hand wheel measurement includes a hand wheel torque value.

4. The system of claim 1, wherein the at least one hand wheel measurement includes a hand wheel velocity.

5. The system of claim 1, wherein the torque value includes a transmission torque value.

6. The system of claim 1, wherein the torque value includes a motor torque value.

7. The system of claim 1, wherein the vehicle include an electric vehicle.

8. The system of claim 1, wherein the instructions further cause the processor to, in response to a determination that the torque value is above the threshold, selectively control return of the hand wheel based on the hand wheel return value.

9. A method for unintended steering mitigation, the method comprising:
    receiving at least one hand wheel measurement corresponding to a hand wheel of a vehicle;
    determining a hand wheel return value corresponding to the at least one hand wheel measurement;
    receiving a torque value corresponding to propulsion of the vehicle;
    determining whether the torque value is above a threshold; and
    in response to a determination that the torque value is above the threshold:
        adjusting the hand wheel return value based on the torque value; and
        selectively controlling return of the hand wheel based on the adjusted hand wheel return value.

10. The method of claim 9, wherein the at least one hand wheel measurement includes a hand wheel position.

11. The method of claim 9, wherein the at least one hand wheel measurement includes a hand wheel torque value.

12. The method of claim 9, wherein the at least one hand wheel measurement includes a hand wheel velocity.

13. The method of claim 9, wherein the torque value includes a transmission torque value.

14. The method of claim 9, wherein the torque value includes a motor torque value.

15. The method of claim 9, wherein the vehicle includes an electric vehicle.

16. The method of claim 9, further comprising, in response to a determination that the torque value is above the threshold, selectively controlling return of the hand wheel based on the hand wheel return value.

17. An unintended steering mitigation apparatus, comprising:
    a controller configured to execute instructions stored on a corresponding memory to:
        receive a hand wheel position of a hand wheel of a vehicle;
        receive a hand wheel torque value of the hand wheel;
        receive a hand wheel velocity of the hand wheel;
        determine a hand wheel return value based on the hand wheel position, the hand wheel torque value, and the hand wheel velocity;
        receive a torque value corresponding to propulsion of the vehicle;
        determine whether the torque value is above a threshold; and
        in response to a determination that the torque value is above the threshold:
            adjust the hand wheel return value based on the torque value; and
            selectively control return of the hand wheel based on the adjusted hand wheel return value.

18. The unintended steering mitigation apparatus of claim 17, wherein the torque value includes a transmission torque value.

19. The unintended steering mitigation apparatus of claim 17, wherein the torque value includes a motor torque value.

20. The unintended steering mitigation apparatus of claim 17, wherein the controller is further configured execute the instructions stored on the corresponding memory to, in response to a determination that the torque value is above the threshold, selectively control return of the hand wheel based on the hand wheel return value.

* * * * *